United States Patent

Kress et al.

[11] Patent Number: 5,865,572
[45] Date of Patent: Feb. 2, 1999

[54] TOOL FOR THE METAL MACHINING TREATMENT OF BORING SURFACES

[75] Inventors: Dieter Kress, Aalen; Herbert Jäger, Sinsheim, both of Germany

[73] Assignee: Mapal, Fabric Fur Prazisionswerkzeuge Dr. Kress KG, Germany

[21] Appl. No.: 923,222

[22] Filed: Sep. 4, 1997

[30] Foreign Application Priority Data

Sep. 5, 1996 [DE] Germany .......... 196 36 045.5
Sep. 6, 1996 [DE] Germany .......... 196 36 127.3

[51] Int. Cl.⁶ .................................. B23B 39/16
[52] U.S. Cl. .................. 408/36; 408/56; 408/57; 408/83.5
[58] Field of Search ............... 408/36, 56, 57, 408/59, 83.5

[56] References Cited

U.S. PATENT DOCUMENTS

| 4,147,462 | 4/1979 | Appleby et al. ............ 408/83.5 |
| 4,692,074 | 9/1987 | Smith et al. ............... 408/36 |
| 4,789,280 | 12/1988 | Dobat et al. .............. 409/233 |
| 4,951,578 | 8/1990 | Von Haas et al. .......... 408/56 |
| 5,044,841 | 9/1991 | Biera et al. ............... 408/36 |
| 5,562,373 | 10/1996 | Willingham et al. ....... 408/56 |
| 5,649,714 | 7/1997 | Uchida et al. ............. 408/57 |
| 5,758,995 | 6/1998 | Sahm ....................... 408/57 |

FOREIGN PATENT DOCUMENTS

| 2 383 738 | 3/1977 | France . |
| 195 19 639 | 5/1995 | Germany . |
| 61-279407 | 12/1986 | Japan ................ 408/146 |
| 61-279408 | 12/1986 | Japan ................ 408/146 |
| 6-190613 | 7/1994 | Japan ................ 408/146 |

*Primary Examiner*—Daniel W. Howell
*Assistant Examiner*—Adesh Bhargava
*Attorney, Agent, or Firm*—Fitch, Even, Tabin & Flannery

[57] ABSTRACT

A tool is proposed for the machining treatment of bore surfaces, consisting of at least two component tools that can be displaced with respect to each other, both of which are provided with machining arrangements, wherein an inner component tool is guided inside an outer component tool, in that the tool (1) comprises a primary piston (13) that—for the purpose of carrying out an extended movement of the inner component tool (7)—can be charged with a certain medium under pressure, in that the primary piston (13) during the extended movement of the inner component tool (7) displaces a medium via a connection channel (25) into an equalizing chamber (27), and in that the equalizing chamber (27) is in the form of a concentric annular chamber, arranged about the axis of rotation, in which an equally annular-shaped compensating piston (29) is movably arranged.

24 Claims, 1 Drawing Sheet

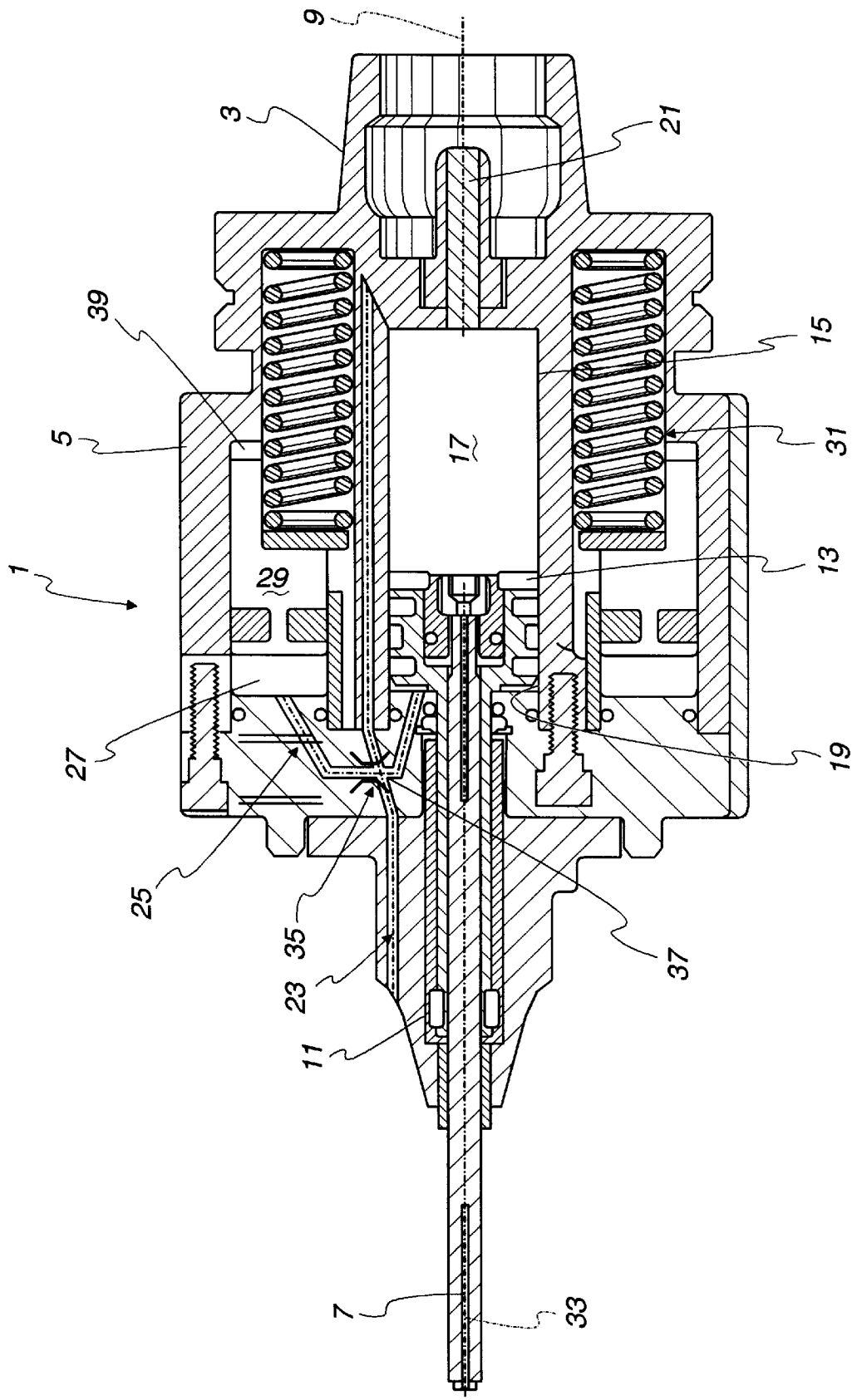

TOOL FOR THE METAL MACHINING TREATMENT OF BORING SURFACES

BACKGROUND OF THE INVENTION

The invention relates to a tool for metal machining bore surfaces with at least two component tools that can be displaced with respect to each other, in accordance with the main concept of claim 1.

Tools of the type addressed here are known. Their purpose is to machine at least two bore surfaces within a workpiece, for example, the surfaces for the valve seat and for the valve stem guide inside the cylinder head of an internal combustion engine (DE 44 31 149 A1). In the case of the known tool, the relative movement of the component tools in the axial direction is brought about by means of an external drive. This leads to a very costly and space-intensive construction of the driving arrangement.

For this reason, it is the task of the invention to create a tool of the initially mentioned type, which does not have these disadvantages and which distinguishes itself by having a very compact construction.

To reach this objective, a tool is proposed which comprises the characteristics as described and claimed herein. The tool distinguishes itself in that it has a primary piston that, for the purpose of producing an extension movement of the inner component tool, can be charged with a certain medium under pressure. During an extension movement, brought about by the medium, the primary piston displaces a medium via [another] connection channel into an equalizing space, arranged concentrically about the axis of rotation of the tool and being in the form of an annular chamber. Inside this annular chamber, an annular compensating piston is movably arranged, this is also displaced during movement of the primary piston. Due to the annular shape of the compensating piston, it is possible to build the tool with the two pistons being very short and compact, which is very advantageous particularly during use in automatic processing stations. Hence, the shorter the tool structures, the more precise are the processed bores.

DETAILED DESCRIPTION OF THE PREFERRED EMBODIMENTS

A preferred example of the tool is discussed, which distinguishes itself in that two different media can be used. The first medium acts on the one side of the primary piston, while the second medium is present on the second side of said primary piston and interacts with the compensating piston. By separating the media, it is assured that impurities in the first medium cannot influence the function of the compensating piston.

Furthermore, a preferred example of the tool is that which distinguishes itself in that a throttle arrangement is provided in the connection channel leading to the equalizing chamber. This influences the discharge of the medium flowing through the connection channel. Due to the fact that during the movement of the inner component tool, which serves for processing the valve stem guide, an arrangement with a throttle is provided, the movement of this component tool, i.e., its rate of advance, can be influenced in such a way that the surface quality in the area of the valve stem guide has the desired properties. In particular, it is possible to ensure an even, slow rate of advance of the component tool and, in this way, ensure the desired surface quality and dimensional accuracy.

A preferred example of the tool is that the throttle arrangement is a constant throttle. Such a construction is simple and can be realized in a cost-effective manner.

Furthermore, a preferred example of the tool is that in which the throttle arrangement comprises at least one check valve, which is constructed in such a way that during a first movement of the component tool serving the valve stem guide, the throttle of the throttle arrangement is active while during a second movement, the check valve becomes active. In this way, it is possible to charge the second component tool with a slow advancing speed and with a rapid withdrawal speed.

Another particularly preferred example of the tool is that which distinguishes itself by the fact that the medium displaced during an advancing movement is guided into an equalizing chamber that is closed off by a compensating piston that preferably has an annular shape and whose effective area is greater than that of a piston that interacts with the movable component tool. In this way, that tool may be very compact.

Further embodiments result from the remaining subclaims.

BRIEF DESCRIPTION OF THE DRAWINGS

The attached drawing is a longitudinal cross-section of the tool which illustrates an embodiment of the invention.

In the case of the tool described here, generally a tool for machining bore surfaces is involved. This tool is preferred in particular for machining valve seat surfaces and the accompanying valve stem guides. In the following, for example, one assumes that a so-called valve seat tool is involved, with which machining of the surfaces for valves of an internal combustion engine is possible.

The figure shows a tool (1) that can be connected with a machine tool via a suitable shaft (3), which in this case is in the form of a hollow shaft. Here, the tool (1) comprises two intermeshing component tools, which are arranged concentrically with respect to each other. The outer first component tool (5) accommodates the inner second component tool (7) inside itself, wherein the second component tool (7) can be axially displaced in the direction of the axis of rotation of the tool (1), shown in broken line form, with respect to the first component tool (5).

A turning movement, applied via the shaft (3) to the first component tool (5), is transferred via a suitable form-locking element (11) to the second component tool (7), whereby the torques are transferred in the retracted as well as in the extended state of the second component tool (7).

In the figure, the second component tool (7) is shown in its extended position.

At the end of the second component tool (7), located in the interior of the first component tool (5), a piston (13) is provided which is displaceably arranged inside a bore (15) in the direction of the axis of rotation (9) and is rigidly coupled with the second component tool. The piston (13) is constructed in such a way that it divides the bore (15) into two chambers (17 and 19) that are separated from each other in a tight [pressure-sealed] manner.

Into the first chamber (17) that, in the cross section shown here, is located to the right of the piston (13), it is possible to introduce a first medium via a supply line (21), for example, a lubricating and/or a cooling-agent that can be used during operation of the tool (1) for the purpose of cooling and lubricating the treated bore surfaces.

The coolant may be guided via a cooling-agent channel (23), comprising several bore sections, toward the left end of the first component tool (5) where a machining means—not shown here—for machining a first bore surface, for example, of the valve seat, is provided.

In the second chamber (19), a second medium, preferably hydraulic oil, is provided; it is closed off by the piston (13) with respect to the lubricating or cooling-agent. The second chamber (19) is hydraulically connected via a connection channel (25) with an equalizing chamber (27). Oil, displaced by the piston (13) during the extension of the first component tool (7), moves via the connection channel (25) from the second chamber (19) into the equalizing chamber (27). The second medium is located in a closed-off system that is separated from the first medium.

The equalizing chamber (27) is in the form of an annular chamber, arranged concentrically about the axis of rotation (9), in which an equally annular compensating piston (29) is movably arranged. On the side of the compensating piston (29), which is opposite the second medium or oil, at least one spring element (31) is provided and is constructed in this case in the form of a helical spring. It is also possible to provide, as a spring element, a gas pressure spring or also merely a tight [pressure-sealed] chamber filled with a compressible gas. The equalizing chamber (27) interacts directly with the chamber (19). The medium displaced from the chamber (19) moves via the connection channel (25) into the equalizing chamber (27). It is shown that the annular equalizing chamber permits a very compact construction of the tool (1) since it is guided in an annular manner around the center of the tool, where the primary piston (13) is located. Accordingly, in the equalizing chamber (27), the annular compensating piston (29) is accommodated, surrounding the interior of the tool and thus the piston (13); in this way, it brings about an increase in the axial longitudinal expansion of the tool (1). Altogether, due to the concentric construction of the primary piston (13) and of the compensating piston (29), a very compact, short construction of the tool (1) results, so that this arrangement—in itself—is very rigid and makes possible a very precise treatment quality.

In order to prevent a tilting of the compensating piston (29), at preferably uniform distances, several spring elements are provided; these charge the compensating piston with pressure and, in the figure shown here, force the same towards the left.

The second component tool (7) is also provided with a continuous channel (33) that is preferably concentric towards the axis of rotation (9) [and] that allows cooling-agents to flow from the first chamber (17) to the left end of the second component tool (7) where machining arrangements are provided, which are not shown here. Additionally, it is possible to introduce here at least one guide bar into the peripheral surface of the second component tool (7). The basic construction of a tool (1), as shown here, is known, so this does not have to be addressed in greater detail.

From the cross section, it can be seen that a throttle arrangement (35) interacts with the connection channel (25) shown by broken lines; this comprises a throttle (37). The same arrangement represents the flow resistance with regard to the medium present in the second chamber (19), while said medium is flowing through the connection channel (25).

The throttle arrangement (35) may be in the form of a constant throttle or a variable throttle. Furthermore, it is also possible to construct the throttle arrangement (35) as a flow regulator that, for example, can be adjusted from the outside (mechanically, electrically, or hydraulically).

Preferably, the throttle arrangement (35) is constructed in such a way that it comprises at least one check valve, not shown here, which during a movement of the piston (13) towards the left is in the closed position, maintaining this closed position while the pressure in the second chamber (19) is greater than in the compensating chamber (27). Furthermore, the check valve is constructed in such a way that it assumes its opened position when the pressure inside the equalizing chamber (27) is greater than in the second chamber (19).

The check valve practically bridges the throttle (37) and ensures that the medium flowing from the second chamber (19) into the equalizing chamber (27) flows exclusively through the throttle (37), while during a reversed flow the throttle (37) is practically bridged and the medium flows via the check valve from the equalizing chamber (27) into the second chamber (19). The manner in which the throttle arrangement (35) functions will be explained below in greater detail.

The compensating piston (29) separates the equalizing chamber (27) from a chamber (39), abutting against one end of the compensating piston (29) that is opposite the equalizing chamber (27), wherein it [chamber 39] may be filled with a compressible medium that may also be connected to the [surrounding] environment via suitable filter arrangements.

In the following text, the function of the tool (1) will be explained in greater detail:

During the machining of a valve seat, the second component tool (7) is pulled entirely into the first component tool (5). With the first component tool (5) at the first valve seat, e.g., a first bore surface, is machined, then the tool (1), and thereby also the first component tool (5), are retracted somewhat so that the processed bore surface or the valve seat surface is no longer touched. During machining of the valve seat, the first medium—in this case a coolant—is introduced into the first chamber (17) via a supply line. From there, the coolant reaches the valve seat surface to be treated via the coolant channel (23). The cooling-agent and the lubricant exiting from the channel (33) are to be ignored at that time, particularly when the cross section of the channel (33) is smaller than the cross section of the cooling-agent channel (23).

During this primary treatment phase, the cooling-agent is under a relatively small overpressure of 4 bar, for example. This pressure is not sufficient for moving the piston (13) towards the left because the compensating piston (29), due to the spring element (31), is charged with a force that is directed towards the left, so that the second medium or [the] oil is displaced out of the equalizing chamber (27), via the check valve not shown here, into the second chamber (19). Thus, on the surface of the piston (13), opposite the first chamber (17), a pressure is present that is greater than the pressure built up by the cooling-agent. The spring element(s) (31) is/are arranged in such a way that the cooling-agent under pressure does not displace the piston (13), and thus the second component tool, while with the first component tool (5) the valve seat is machined in the first processing step. The force of the spring element(s) (31) must be selected high enough so that during the first treatment phase, in which the second component tool (7) is not yet to be extended, an adequate cooling and lubrication are ensured.

Upon completion of the first treatment phase, the cooling-agent pressure is increased so that the pressures built up by the spring element (31) and which are to be transferred to the piston (13) via the second medium, are overcome. In this phase, the cooling-agent pressure is, for example, approximately 15 bar.

The pressure built up by means of the cooling-agent inside the first chamber (17) is transferred via the piston (13) onto the second chamber (19). Thereby, the pressure finally increases in the second chamber (19) to such an extent that the piston (13) is displaced towards the left and the second medium or the oil is displaced via the connection channel (25) from the second chamber (19) into the equalizing chamber (27). At that time, a pressure drop occurs above the throttle (37) of the throttle arrangement (35), so that the pressure in the second chamber (19) is higher than the pressure in the equalizing chamber (27). Thereby, the check valve is closed so that the fluid displaced by the piston (13) from the second room (19) flows exclusively via the connection channel (25) and via the throttle (37), i.e. not across the check valve.

By means of the throttle (37) of the throttle arrangement (35), a flow resistance is built up, by means of which it is ensured that the second medium flows out of the second chamber (19) in a defined manner. This brings about a defined advance movement of the piston (13) inside the bore (15), and thus a uniform movement of the second component tool (7) with respect to the first component tool (5). The speed of the advance movement may be influenced by the throttle arrangement and may be set to a desired value.

In this second treatment phase, with the aid of the second component tool (7), the valve stem guide, i.e., the second drill surface, is treated. The treatment area is reached by the cooling and lubricating agent flowing from the first chamber (17) via the channel (33) towards the left end of the second component tool (7).

Upon treatment of the valve stem guide, the pressure inside the cooling-agent supply is lowered, preferably in a sudden manner. Thereby, the pressures in the first chamber (17) result, having an effect upon the piston (13), so that the pressure in the second chamber (19) also drops. In the equalizing chamber (27), due to the spring element (31) which has an effect on the compensating piston (29) and presses the same towards the left, an overpressure is built up. At that point, the compensating piston (29) displaces the second medium from the equalizing chamber (27) into the second chamber (19). Since the oil cannot flow off readily via the throttle (37) from the equalizing chamber (27) into the second chamber (19), a higher pressure occurs in the equalizing chamber (27) than in the second chamber (19). Due to these pressure conditions, the check valve opens.

By opening the check valve, the throttle (37) is bridged, so that the flow resistance between the equalizing chamber (27) and the second chamber (19) is greatly reduced. For this reason, the oil can flow very rapidly from the equalizing chamber (27) into the second chamber (19). Thereby, pressures are exerted on the piston (13), displacing the same towards the right. Thus, the pressures produce a retraction movement of the second component tool (7) with respect to the first component tool (5), wherein this movement can take place relatively quickly, since via the spring element (31) rather high pressures can be exerted on the compensating piston (29), displacing the oil rapidly from the equalizing chamber (27) into the second chamber (19). The retraction speed may be determined by selecting the forces exerted by the spring element.

In order to ensure a very rapid retraction movement of the second component tool (7), several check valves may be provided as well, which establish a hydraulic connection between the equalizing chamber (7) and the second chamber (19), which distinguishes itself by having a very small flow resistance.

Hence, during a sudden pressure drop in the cooling-agent supply, a sudden retraction movement of the second component tool (7) takes place when the throttle arrangement (35) is provided with at least one check valve of the type described here.

It is also essential that the surface of the piston (13), which is charged with the second medium or with the oil, be much smaller than the surface of the compensating piston (29), which is charged with this second medium. For this reason, the volume displaced by the piston (13), which flows from the second chamber (19) into the equalizing chamber (27), produces merely a comparatively small displacement of the compensating piston (29), while the second component tool (7) extends relatively far from the first component tool (5). For this reason, the surface conditions selected here are particularly simple to realize because the compensating piston (29) is annular and is guided around the piston (13). In this way, the desired larger surface of the compensating piston (29) is brought about in a simple way.

For example, it is possible, in the case of a displacement of the second component tool by approximately 50 mm, to achieve a lift of merely 6 mm at the compensating piston (29). These paths result when the ratio of the pistons (13 and 29) is approximately 1:8. Hence, the tool shown here is formed in a very small and compact manner. For this reason, it is also relatively lightweight.

Advantageously, it is possible to provide a control device that determines the amount of the second medium or the amount of the hydraulic oil present in the second chamber (19) and the equalizing chamber. It is conceivable to provide a control pin that ends flush with the surface of the tool when the desired oil reserve is present and which is lowered when a loss occurs.

It becomes clear that with the tool (1), two bore surfaces which are preferably arranged in a concentric manner can be machined. For the treatment of the first bore surface or of the valve seat, the first component tool (5) is provided, while for the machining of the second bore surface or machining of the valve stem guide, the second component tool (7) is used. The machining of the bore surfaces may take place successively, wherein particularly during the machining of the valve stem guide with the aid of the second component tool (7), a defined advance is achieved. This can be adjusted due to the fact that the throttle arrangement (35) comprises a throttle (37). The use of the tool (1) in machining stations is particularly feasible because a very rapid retraction of the second component tool (7) is possible due to the special construction of the throttle arrangement (35), namely because at least one check valve is provided, permitting a rapid backflow of the second medium from the equalizing chamber (27) into the second chamber (19), thus ensuring a rapid retraction movement of the second component tool (7) as soon as the pressure of the cooling-agent, serving the extended movement of the second component tool (7), is lowered. Hence, following the machining of a valve stem guide, the tool (1) can be rapidly moved to the next machining site.

The advance movement or the advance speed of the second component tool (2) is influenced by the pressure of the cooling-agent, by the flow resistance of the throttle (7), and by the counterpressure of the spring element (31). Hence, there are numerous possibilities for adjusting the movement speed of the second component tool (7). In particular, it is conceivable to increase the pressure of the cooling-agent continuously in order to counteract the increasing counterpressure of the spring element (31) and in order to ensure a uniform advance movement of the second component tool (7) across the latter's entire working stroke. A uniform advance movement may also be achieved by means of an appropriately placed flow regulator.

Finally, it becomes clear that the tool (1) described here is constructed in a relatively simple manner. It is readily possible to accommodate two pistons, namely the primary piston (13) and the compensating piston (29), in the interior of the tool (1) and, at that time, to ensure a very compact structure. In particular, it is ensured that the length, measured in the longitudinal direction or in the direction of the axis of rotation of the tool (1), is very short when compared with other tools. For this reason, the tool described here distinguishes itself by a very great rigidity, which makes a very precise treatment of bore surfaces possible. The [lateral] deflection of the tool during the treatment of valve surfaces is very small, so that the treated surfaces distinguish themselves by a very high precision and surface quality.

We claim:

1. In a tool arrangement for machining multiple bore surfaces with at least two component tools that can be displaced with respect to each other including an inner component tool which is nested within an outer component tool, the improvement wherein the tool arrangement comprises a body defining a bore wall, a primary piston within the bore wall carrying the inner component tool, means associated with the body for introducing a first medium within the bore wall for the purpose of executing an extending movement of the inner component tool with the primary piston, during the extension movement of the inner component tool, displacing a second medium via a connection channel extending from the bore wall into an equalizing chamber, with the equalizing chamber having an annular form and arranged about the bore wall, and an annular-shaped compensating piston carrying the outer component tool movably arranged within the equalizing chamber.

2. The improved tool arrangement in accordance with claim 1, wherein the first medium is different from the second medium.

3. The improved tool arrangement in accordance with claim 1, wherein the first medium is a cooling-agent and the second medium is an oil.

4. The improved tool arrangement in accordance with claim 1, wherein a throttle arrangement, which influences the flow of the second medium into the equalizing chamber, is located in the connection channel.

5. The improved tool arrangement in accordance with claim 4, wherein the throttle arrangement comprises a constant throttle.

6. The improved tool arrangement in accordance with claim 4, wherein the throttle arrangement comprises a variable throttle.

7. The improved tool arrangement in accordance with claim 4, wherein the throttle arrangement is in the form of a flow regulator.

8. The improved tool arrangement in accordance with claim 4, wherein the throttle arrangement comprises at least one check valve that, during the return flow of the second medium from the equalizing chamber into the second chamber, has a greatly reduced flow resistance.

9. The improved tool arrangement in accordance with claim 8, wherein the check valve opens when the pressure of the second medium inside the equalizing chamber is greater than that of the first medium in the first chamber.

10. The improved tool arrangement in accordance with claim 1, wherein the surface of the compensating piston is greater than that of the primary piston.

11. The improved tool arrangement in accordance with claim 1, wherein the compensating piston interacts with a spring element that acts against the force exerted by the second medium.

12. The improved tool arrangement in accordance with claim 11, wherein the spring element is in the form of a helical spring or a gas pressure spring.

13. In a tool arrangement for machining multiple bore surfaces with at least two component tools that can be displaced with respect to each other, wherein an inner component tool is guided inside an outer component tool, the improvement wherein the tool arrangement comprises a primary piston mounted in a body which is coaxially nested within an annular outer, equalizing chamber, an annular compensating piston mounted in the equalizing chamber, means associated with the body for introducing a first medium within the body to impart an extending movement to said primary piston, a closed fluid circuit extending between said primary piston and said compensating piston, the closed fluid circuit captively sealing a second medium against contact with said first medium, with the compensating piston acting upon the primary piston through the second medium to alter its extending movement.

14. The improved tool arrangement in accordance with claim 13, wherein the first medium is different from the second medium.

15. The improved tool arrangement in accordance with claim 13, wherein a throttle arrangement, which influences the flow of the second medium into the equalizing chamber, is located in the connection channel.

16. The improved tool arrangement in accordance with claim 15, wherein the throttle arrangement comprises a constant throttle.

17. The improved tool arrangement in accordance with claim 15, wherein the throttle arrangement comprises a variable throttle.

18. The improved tool arrangement in accordance with claim 15, wherein the throttle arrangement is in the form of a flow regulator.

19. The improved tool arrangement in accordance with claim 15, wherein the throttle arrangement comprises at least one check valve that, during the return flow of the second medium from the equalizing chamber into the second chamber, has a greatly reduced flow resistance.

20. The improved tool arrangement in accordance with claim 19, wherein the check valve opens when the pressure of the second medium inside the equalizing chamber is greater than that of the first medium in the first chamber.

21. The improved tool arrangement in accordance with claim 13, wherein the surface of the compensating piston is greater than that of the primary piston.

22. The improved tool arrangement in accordance with claim 13, wherein the compensating piston interacts with a spring element that acts against the force exerted by the second medium.

23. The improved tool arrangement in accordance with claim 22, wherein the spring element is in the form of a helical spring or a gas pressure spring.

24. The improved tool arrangement in accordance with claim 14, wherein the first medium is a cooling-agent and the second medium is an oil.

* * * * *